(12) United States Patent
Selius et al.

(10) Patent No.: US 8,214,284 B2
(45) Date of Patent: Jul. 3, 2012

(54) COMPUTER SYSTEM AND COMPUTER-IMPLEMENTED METHOD FOR MANAGING FUNDING OF CATASTROPHE RELIEF EFFORTS

(75) Inventors: Albert Otto Selius, Larchmont, NY (US); Maria Giovanna Guatteri, New York, NY (US)

(73) Assignee: Swiss Reinsurance Company Ltd., Zürich (CH)

( * ) Notice: Subject to any disclaimer, the term of this patent is extended or adjusted under 35 U.S.C. 154(b) by 956 days.

(21) Appl. No.: 12/029,847

(22) Filed: Feb. 12, 2008

(65) Prior Publication Data

US 2009/0204486 A1    Aug. 13, 2009

(51) Int. Cl.
*G06Q 40/00* (2012.01)

(52) U.S. Cl. ............ 705/38; 705/36 R; 705/37; 705/39; 705/40; 705/41; 705/42; 705/43; 705/44; 704/231; 708/100

(58) Field of Classification Search .......... 705/36 R–44; 704/231; 708/100
See application file for complete search history.

(56) References Cited

U.S. PATENT DOCUMENTS

| 7,711,634 B2 | 5/2010 | Klugman |
| 2007/0226154 A1 | 9/2007 | Palmieri |

*Primary Examiner* — Daniel Felten
(74) *Attorney, Agent, or Firm* — Oblon, Spivak, McClelland, Maier & Neustadt, L.L.P.

(57) ABSTRACT

A special purpose entity offers a financial product linked to a charitable organization. A monetary donation is made to the charitable organization for paying a premium assigned to the financial product. Capital payments are received from one or more investors for the financial product. The premium is paid by the special purpose entity to the investors. Upon occurrence of a catastrophic event assigned to the financial product, the capital is paid from the special purpose entity to the charitable organization, for funding relief efforts for the catastrophic event. Otherwise, the capital is repaid from the special purpose entity to the investors. Charities and donors can prepare a country for natural and man-made disasters by putting in place funding before a catastrophic event actually occurs.

8 Claims, 3 Drawing Sheets

COMPUTER SYSTEM AND COMPUTER-IMPLEMENTED METHOD FOR MANAGING FUNDING OF CATASTROPHE RELIEF EFFORTS

FIELD OF THE INVENTION

The present invention relates to a computer system and a computer-implemented method for managing funding of catastrophe relief efforts. Specifically, the present invention relates to a computer system and a computer-implemented method for managing funding of relief efforts for catastrophes caused by natural or man-made disasters such as earthquakes, tsunamis, hurricanes, typhoons, floods, terrorism attacks, and infectious diseases.

BACKGROUND OF THE INVENTION

Conventionally, a key component of disaster recovery is insurance. Catastrophe insurance can provide developing countries with the financial means to cope and recover from a loss when resources are scarce. Unfortunately, insurance may be too expensive or unavailable for many developing and catastrophe prone regions. With proper planning, economies and countries can be prepared for disasters before they happen.

Charitable organizations (charities) lend help to countries at the time of disasters, but if a mechanism was setup where the funding for such a catastrophic event was already in place, then it would remove much of the strain of soliciting funds and also provide leverage to the charities in sourcing funds.

Patent application US 2007/0226154 discloses a method for benefiting charitable organizations integrating annuities, mortality contingent bonds or other mortality-hedging derivatives. According to US 2007/0226154, donors select benefiting charities. At least one lending entity issues a mortality contingent bond loan or a derivative loan to a qualified tax-exempt charitable organization that then uses funds from the mortality contingent bond loan or the derivative loan to purchase annuities from at least one commercial life insurance company. The donors are named as the annuitants of the annuities. The qualified tax-exempt charitable organization will then use funds from the annuity payments to amortize the mortality contingent bond loan or the derivative loan and will also donate a portion of the annuity payments to the benefiting charities selected by the donors.

SUMMARY OF THE INVENTION

It is an object of this invention to provide a computer system and a computer-implemented method for managing funding of catastrophe relief efforts. In particular, it is an object of the present invention to provide a computer system and a computer-implemented method for managing funding of catastrophe relief efforts such that the funding is in place before the catastrophic event actually occurs.

According to the present invention, these objects are achieved particularly through the features of the independent claims. In addition, further advantageous embodiments follow from the dependent claims and the description.

According to the present invention, the above-mentioned objects are particularly achieved in that, for managing funding of catastrophe relief efforts, defined is a special purpose entity which offers a financial product linked to a charitable organization. Payment of a premium assigned to the financial product is received from the charitable organization. The premium corresponds to a monetary donation made to the charitable organization. Payment of capital for the financial product is received from one or more investors. Payment of the premium is issued as a coupon from the special purpose entity to the investors. Upon occurrence of a catastrophic event assigned to the financial product, payment of the capital is issued from the special purpose entity to the charitable organization for funding relief efforts for the catastrophic event. For the payment of the capital to the charitable organization to take place, the catastrophic event must occur within a defined time period associated with the financial product, e.g. one, two, five or ten years. Otherwise, the capital is repaid from the special purpose entity to the investors. Linking a financial product (e.g. a security, a derivative, a bond or another financial instrument) for disaster relief to a charity has the advantage that charities and donors can prepare a country or state, for example, for natural and man-made disaster events. Furthermore, the charitable organizations and profiting countries or states can leverage received (tax-deductible) donations by buying insurance through the special purpose entity. Thus, the proposed method for managing funding of catastrophe relief efforts enables charitable organizations to put in place funding before a catastrophic event actually occurs.

In an embodiment, information about catastrophic events is received by the special purpose entity. Preferably, this information includes a parametric index which indicates the severity of the catastrophic event assigned to the financial product. In that case, payment of the capital to the charitable organization is triggered depending on the parametric index. In a further embodiment, the amount of the capital (partial or full amount of the capital) paid to the charitable organization depends on the parametric index. For example, the parametric index is linked to one or more defined geographical areas, a selected type of catastrophe, and/or a severity of the catastrophic event. Particularly, the type of catastrophe includes earthquakes, tsunamis, hurricanes, typhoons, floods terrorism attacks, and/or infectious diseases. Accordingly, the severity of the catastrophic event includes intensity of the catastrophic event, e.g. intensity of ground shaking, speed of wind or water level, and/or a population number indicating the number of people affected by the catastrophic event.

In a further aspect, the present invention further relates to a computer system and a computer-implemented method for managing funding of catastrophe relief efforts by defining a special purpose entity which offers a financial product linked to a charitable organization; receiving from one or more investors payment of capital for the financial product; receiving from donors payment of coupons assigned to the financial product; issuing payment of the coupons from the special purpose entity to the investors; and issuing payment of a defined first (e.g. minor) portion of the capital from the special purpose entity to the donor, and a remaining second (e.g. major) portion of the capital from the special purpose entity to a charitable organization, for funding relief efforts for a catastrophic event assigned to the financial product, otherwise, repayment of the capital from the special purpose entity to the investors.

In addition to a computer system and a computer-implemented method for managing funding of catastrophe relief efforts, the present invention also relates to computer program products including computer program code means for controlling one or more processors of a computer system, particularly, computer program products including a computer readable medium containing therein the computer program code means. The computer program code means are configured to control the processors such that the computer system performs the method of managing funding of the catastrophe relief efforts.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
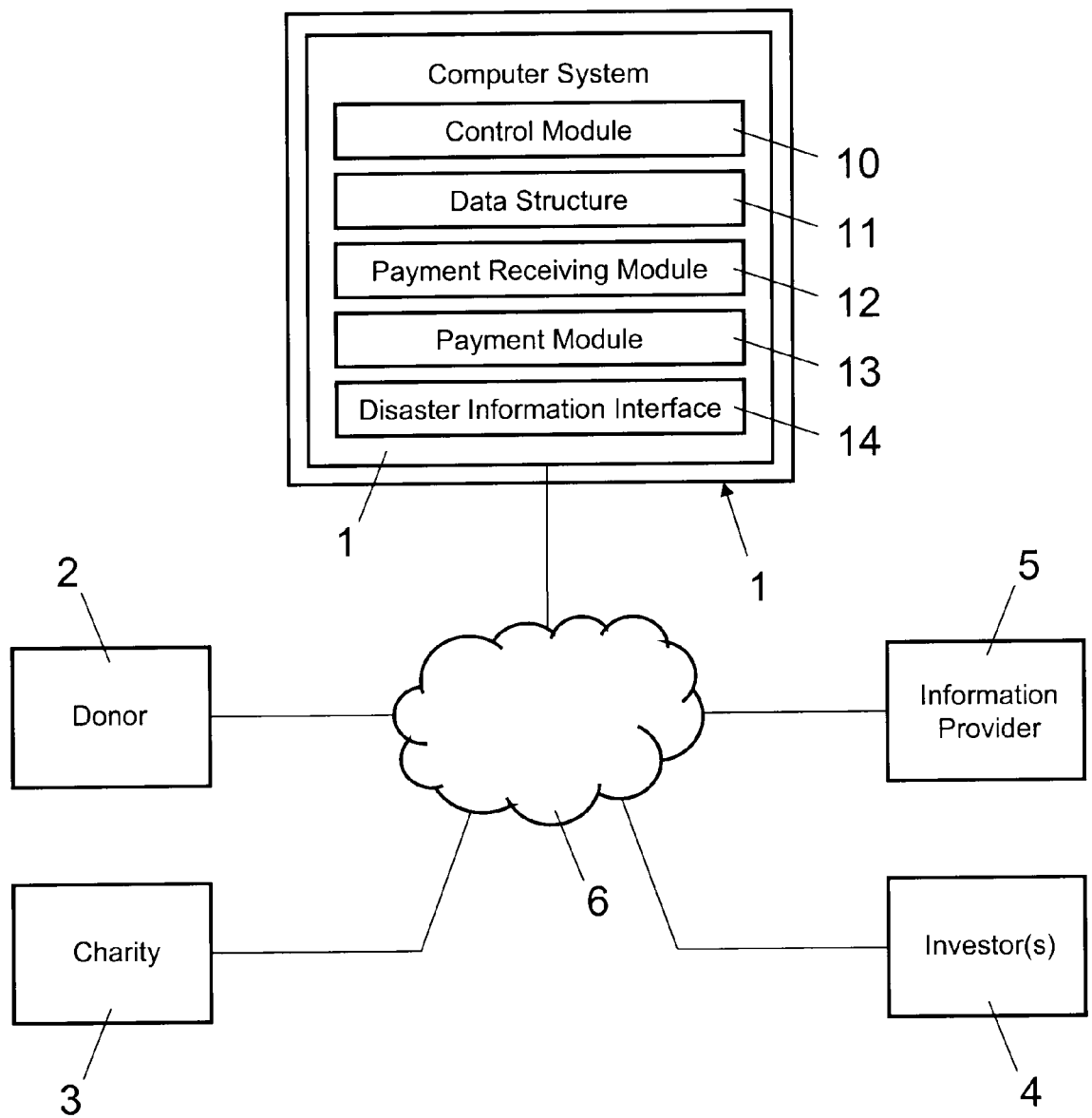
FIG. 1 shows a block diagram illustrating schematically an exemplary configuration of a computer system for practicing embodiments of the present invention.

In FIG. 1, reference numeral 1 refers to a computer system including one or more computers, for example personal or server computers, each comprising one or more processors. Computer system 1 is associated with a special purpose entity 1', also called special purpose vehicle (SPV). A special purpose entity is a corporate body, e.g. a limited company or partnership, defined and created to fulfill narrow, specific and/or temporary objectives, primarily to isolate financial risks such as bankruptcy, regulatory risks or taxation. Typically, a special purpose entity is not owned by the sponsor, i.e. the entity on whose behalf the special purpose entity is set up. Thus, a special purpose entity is typically set up as a company with professional directors provided by an administration company to ensure there is no connection with the sponsor.

As is illustrated schematically in FIG. 1, computer system 1 further includes various functional modules, namely a control module 10, a payment receiving module 12, a payment module 13, and a disaster information interface 14. Preferably, the functional modules are implemented as programmed software modules. The computer program code of the software modules is stored in a computer program product, i.e. in a computer readable medium, either in memory integrated in a computer of computer system 1 or on a data carrier that can be inserted into a computer of computer system 1. Alternatively, the functional modules are implemented partly or fully by means of hardware components.

Computer system 1 further comprises a data structure 11 which represents a financial product linked to a charitable organization and offered by the special purpose entity 1'. For identification and definition of the financial product, data structure 11 includes a product identifier, a product type, a contract duration, a monetary amount of protection for a defined premium, as well as identification of a charitable organization (charity) and/or a definition of a linked catastrophe. Instead of or in addition to a charitable organization, the data structure 11 may refer to a catastrophe relief organization. For example, the linked catastrophe is defined by a type of catastrophe, a geographic area, a parametric index relevant for the catastrophe, and severity or index threshold values for triggering partial or full payout of the protection to the charitable organization or directly to the relief organization. The catastrophe type includes, for example, natural or man-made disasters such as earthquakes, tsunamis, hurricanes, typhoons, floods, terrorism attacks, and infectious diseases. The geographic area defines, for example, a country, a state, a continent or another geographic territory. The severity or index threshold values include criteria for the intensity of the catastrophic event and/or population number affected by the catastrophic event. Depending on the type of catastrophe, intensity is indicated by wind speed, water level, shaking intensity and/or size of population affected, for example. Table 1 illustrates various examples of catastrophes linked to the financial product.

TABLE 1

| Catastrophe Type | Geographic Area | Parametric Trigger |
| --- | --- | --- |
| Earthquake | Guatemala | Intensity and population |
| Tsunami | Indonesian | Intensity and population |
| Hurricane | Caribbean | Wind speed, size of storm and location |
| Infectious disease | Sub-Saharan Africa | Number of Malaria deaths (e.g. based on CDC statistics) |

Reference numerals 2, 3 and 4 refer to a donor, a charitable organization, or one or more investor(s), respectively. In an embodiment donor 2, charitable organization 3, and/or investor(s) 4 are associated with a respective computer system, each comprising one or more computers with one or more processors, or a communication terminal such as a personal computer, a laptop computer, a mobile radio telephone or a personal digital assistant.

Reference numeral 5 refers to an information provider comprising a computer system which is configured to provide information about catastrophic events, particularly catastrophe type, location and severity of the catastrophic events. In a preferred embodiment, the information about catastrophic events includes a parametric index indicative of the severity of catastrophic events. Depending on the implementation, information provider 5 is an online provider of parametric catastrophe index, and/or a computer-based database updated periodically or continuously with event information from a plurality of measuring and/or reporting stations distributed globally or in a defined geographical area.

Reference numeral 6 refers to a telecommunication network interconnecting computer system 1 with computer systems associated respectively with donor 2, charitable organization 3, investor(s) 4, and/or information provider 5. Telecommunication network 6 includes fixed networks and/or wireless networks. For example, telecommunication network 6 includes a local area network (LAN), an integrated services digital network (ISDN), the Internet, a global system for mobile communication (GSM), a universal mobile telephone system (UMTS) or another mobile radio telephone system, and/or a wireless local area network (WLAN).

Although not illustrated computer system 1 as well as possible further computer systems associated respectively with donor 2, charitable organization 3, investor(s) 4, and/or information provider 5, are provided with a communication module which is configured to enable data communication among the computer systems via telecommunications network 6.

The disaster information interface 14 is configured to retrieve and receive catastrophic event information automatically and proactively from information provider 5, e.g. in a periodic pull mode, or as provided automatically by information provider 5 in push mode. Alternatively, catastrophic event information may be loaded manually, e.g. using a keyboard, or as batch files through disaster information interface 14.

Figure 2:
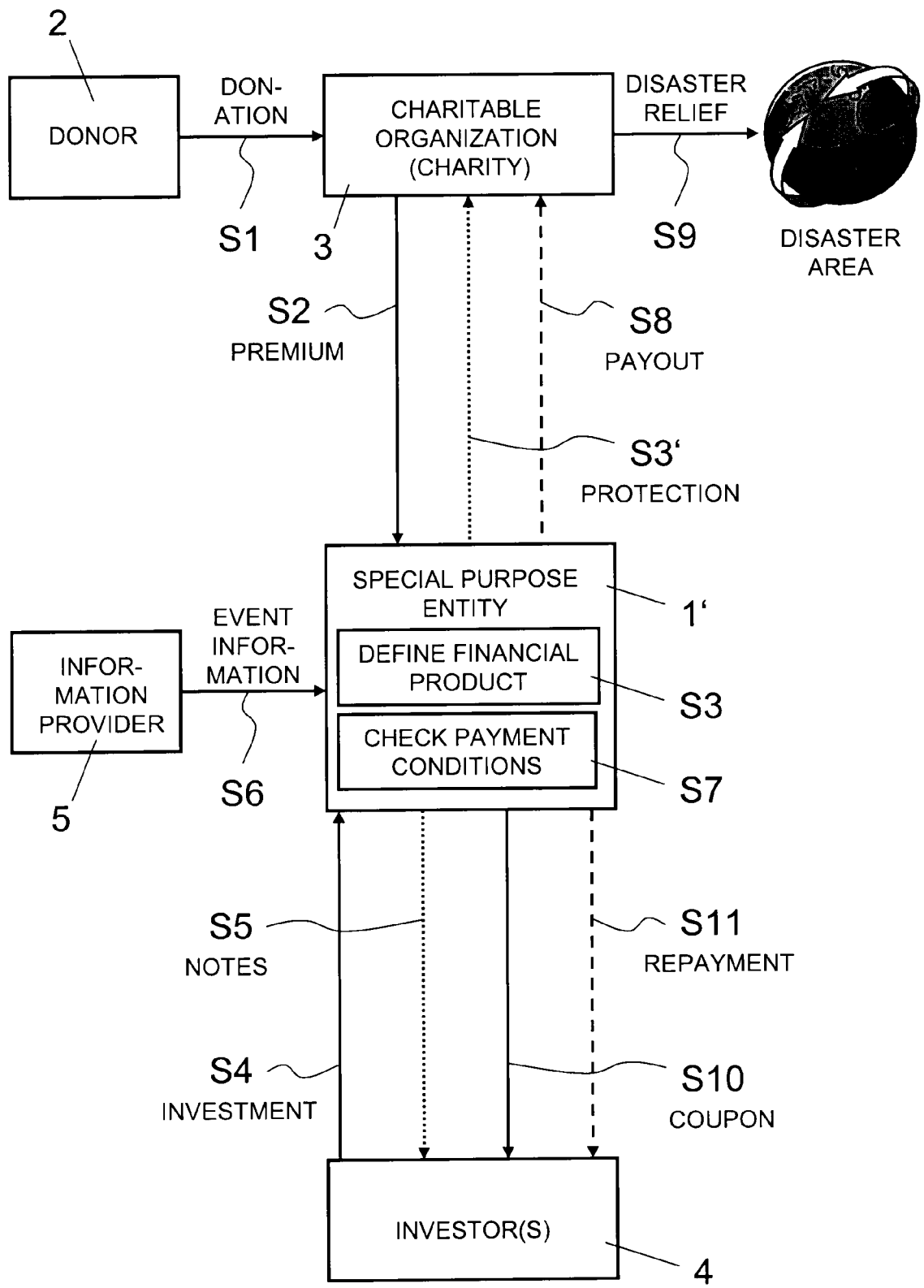
FIG. 2 shows a flow diagram illustrating an example of a sequence of monetary and/or information flow executed according to the present invention.
Figure 3:
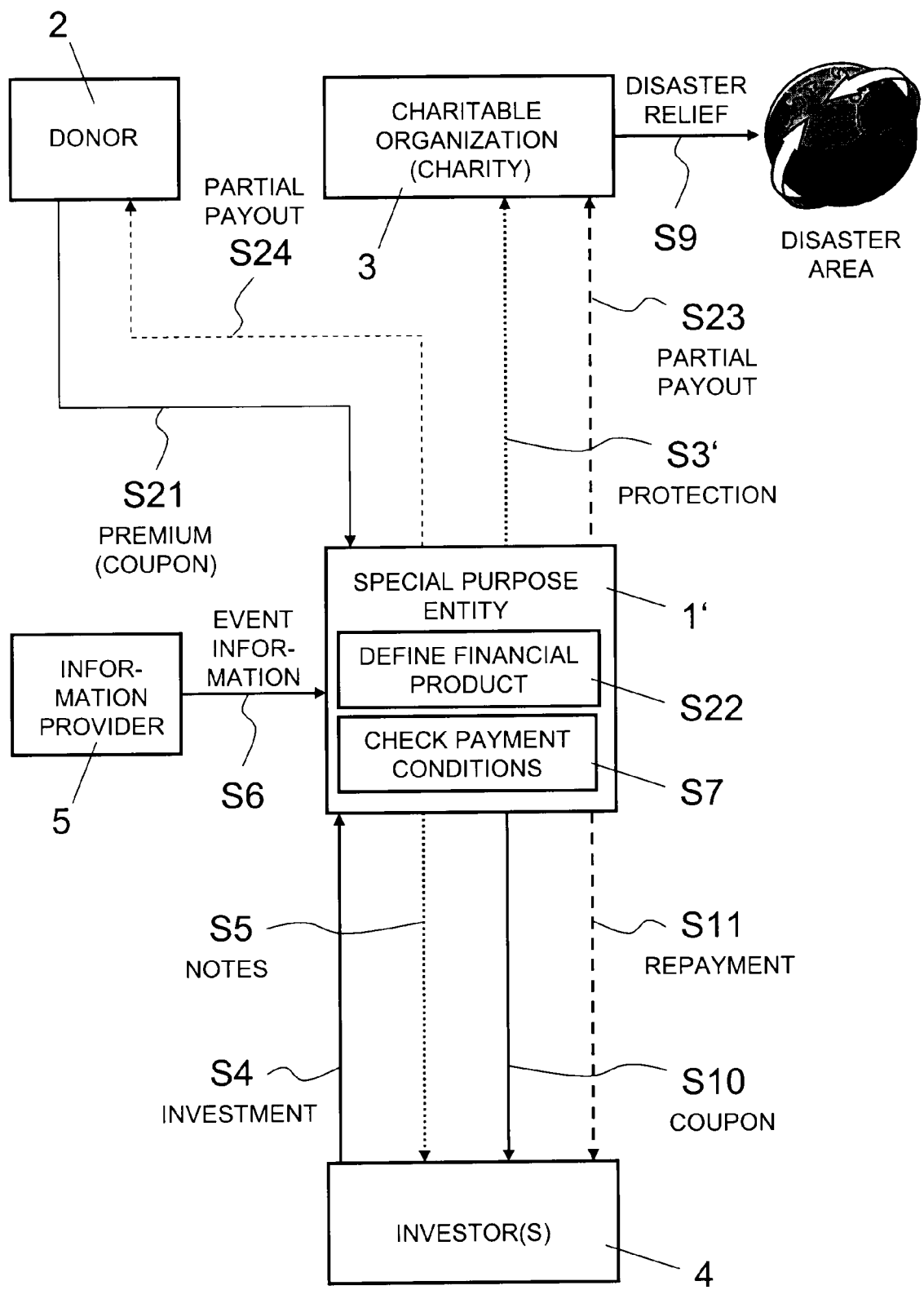
FIG. 3 shows a flow diagram illustrating another example of a sequence of monetary and/or information flow executed according to the present invention.

In the following paragraphs, described with reference to FIGS. 2 and 3 is an exemplary sequence of data flow, representative of monetary and information flow, executed according to the present invention.

In step S1, a donor 2 makes a tax deductible donation to a charitable organization 3, e.g. US$ 3Mio.

In step S2, the charitable organization 3 purchases catastrophe protection for specified catastrophes in a defined area from the special purpose entity 1' by paying a premium to the special purpose entity 1'. For example, the charitable organization 3 purchases a coverage of US$ 100Mio. for earthquakes occurring in Guatemala within a contract duration of five years, by paying an amount corresponding to the donation received from the donor 2. Thus, payment receiving module 12 receives from the charitable organization 3 a purchase request including the premium payment and specification of protection. In a computer-implemented embodiment, the payment and specification of protection is transmitted from the computer system of the charitable organization 3 to payment receiving module 12 via telecommunications network 6. For that purpose, control module 10 provides to the charitable organization 3 a user or data interface, e.g. accessible through a conventional browser such as Internet Explorer by Microsoft, or Firefox by the Mozilla Foundation.

In step S3, the special purpose entity 1' defines a financial product for the protection requested in step S2. The financial product is linked to the catastrophe(s) defined in step S2 and provides the requested coverage for the specified duration and location. To represent the financial product in computer system 1, control module 10 creates and stores a respective data structure 11 as described above. As indicated schematically by step S3', through definition of the financial product, the charitable organization 3 is assigned protection.

In step S4, the special purpose entity 1' receives payment of capital from one or more investors for the financial product, e.g. US$ 10Mio. to provide the requested protection coverage. Thus, payment receiving module 12 receives from the investors 3 an investment request including the capital payment and specification of financial product. Optionally, in step S5, Notes corresponding to the capital payment are issued by the special purpose entity 1' to the investor(s) 4. In a computer-implemented embodiment, the payment of the capital is transmitted from the investors' computer systems to payment receiving module 12 via telecommunications network 6. For that purpose, control module 10 provides to the investors a data or user interface, e.g. accessible through a conventional browser such as Internet Explorer by Microsoft, or Firefox by the Mozilla Foundation.

One skilled in the art will understand that alternative sequences of steps are possible for defining, requesting and setting up protection, e.g., depending on the embodiment, the order of steps may be defined by the sequence S1, S2, S3, S4, S5, S3' or S3, S1, S2, S4, S5, S3' or S3, S4, S5, S1, S2, S3', for example.

In Step S6, control module 10 receives from the information provider 5 information about an actual catastrophic event. As mentioned above in the context of information provider 5, the information about the catastrophic event is transmitted and received in pull or push mode.

In step S7, payment module 13 checks whether or not the information about an actual catastrophic event meets payment conditions of the financial product(s) provided by the special purpose entity 1'. Specifically, payment module 10 checks whether or not the type and location of the actual catastrophe relates to the offered financial product(s), and whether or not any possible conditions on severity and/or parametric index value are met. If the conditions are met for payout of a financial product, in step S8, payment module 13 issues a full or partial payment of the coverage (invested capital) to the charitable organization 3 (or disaster relief organization) linked to the respective financial product. In an embodiment, the portion of the invested capital that is paid to the charitable organization (or disaster relief organization) depends on the value of the severity and/or parametric index value. For example, an earthquake event which causes in the respective country a ground shaking intensity of level VI triggers the payment module 13 to pay 50% of the invested capital, whereas a ground shaking intensity of level VII and above triggers the payment module 13 to pay the full amount of the invested capital to the charitable organization or directly to a defined disaster relief organization.

In step S9, if the coverage is not paid directly by the special purpose entity 1' to a disaster relief organization, the charitable organization distributes the received funds to one or more disaster organization for financing the recovery from the catastrophic disaster.

In step S10, at the end of the contract duration of the respective financial product, payment module 13 pays to the investor(s) 4 an agreed upon coupon, e.g. an amount corresponding to the premium paid by the charitable organization 3.

In step S11, if no linked catastrophic event occurred within the contract duration of the respective financial product, payment module 13 pays back to the investor(s) 4 the invested capital.

In an alternative embodiment according to FIG. 3, in step S21, the donor 2 pays the coupon for the financial product to the special purpose entity 1'. For example, the coupon is paid together with the specification of protection for a specified charitable organization 3. In essence, the donor 2 purchases for a charitable organization 3 protection for specified catastrophes in a defined area from the special purpose entity 1' by paying the coupon as a premium to the special purpose entity 1'. For example, the donor 2 purchases for the charitable organization 3 a coverage of US$ 100Mio. for tsunamis affecting Indonesia within a contract duration of ten years, by paying a premium corresponding to a coupon of US$ 3Mio. Thus, payment receiving module 12 receives from the donor 2 a purchase request including the premium payment and specification of charitable organization and protection. In a computer-implemented embodiment, the payment and specification of protection and charitable organization is transmitted from the donor's computer system to payment receiving module 12 via telecommunications network 6. For that purpose, control module 10 provides to the donor 2 a user or data interface, e.g. accessible through a conventional browser such as Internet Explorer by Microsoft, or Firefox by the Mozilla Foundation.

In step S22, the special purpose entity 1' defines a financial product for the protection requested in step S21. The financial product is linked to the catastrophe(s) defined in step S21 and provides the requested coverage for the specified duration and location. To represent the financial product in computer system 1, control module 10 creates and stores a respective data structure 11 as described above. In the data structure 11, the donor 2 is registered for receiving a portion of a possible payout, as will be explained later.

In step S4, the special purpose entity 1' receives payment of capital from one or more investors for the financial product, and in step S5, Notes corresponding to the capital payment are issued optionally to the investor(s) 4, as described above with reference to FIG. 2.

One skilled in the art will understand that alternative sequences of steps are possible for defining, requesting and setting up protection, e.g., depending on the embodiment, the order of steps may be defined by the sequence S21, S22, S4, S5, S3' or S22, S21, S4, S5, S3' or S22, S4, S5, S21, S3', for example.

In steps S6 and S7, information about an actual catastrophic event is received and processed as described above.

If the conditions are met for a financial product, in step S23, payment module 13 issues a payment of the coverage corresponding to a major portion of the invested capital to the respective charitable organization 3 (or disaster relief organization). In step S24, payment module 13 issues a payment of the remaining (minor) portion of the invested capital to the respective donor 2 who paid the premium (coupon).

In step S9, the received funds are distributed as described above.

In steps S10 and S11, the coupon and possibly the invested capital are paid to the investor(s) 4 as described above.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims.

What is claimed is:

1. A computer-implemented method for managing funding of catastrophe relief efforts associated with a special purpose entity, the method comprising:

receiving, by a payment receiving module executed by a computer of the special purpose entity, a purchase request from a charitable organization via a telecommunication network, wherein the purchase request comprises data defining a premium payment and specification of protection;

storing, in a memory device associated with the computer of the special purpose entity, an electronic data structure, which represents a financial product of the special purpose entity;

offering the financial product to a donor by a control module executed by the computer of the special purpose entity;

receiving, by the payment receiving module executed by the computer of the special purpose entity, from the charitable organization payment of a premium assigned to the financial product, the premium corresponding to a monetary donation made to the charitable organization by the donor;

receiving, by the payment receiving module executed by the computer of the special purpose entity, via the telecommunication network, an investment request comprising a capital payment assigned to the financial product from one or more investors and a specification of the financial product, receiving, by the payment receiving module executed by the computer of the special purpose entity, via the telecommunication network, from one or more investors payment of capital for the financial product;

paying, by a payment module executed by the computer of the special purpose entity, an agreed upon amount corresponding to the premium paid by the charitable organization to the one or more investors, wherein the payment module is connected over the telecommunication network to a computer system or systems of the one or more investors;

receiving information about a catastrophic event including a parametric index indicative of a severity of the catastrophic event assigned to the financial product; and issuing payment of the capital from the special purpose entity to the charitable organization, upon occurrence of the catastrophic event assigned to the financial product, for funding relief efforts for the catastrophic event, and repayment of the capital from the special purpose entity to the investors, otherwise.

2. The method of claim 1, wherein the parametric index is associated with at least one of defined geographical area, selected type of the catastrophic event, and severity of the catastrophic event.

3. The method of claim 1, wherein the parametric index is associated with a selected type of the catastrophic event and a severity of the catastrophic event, the type of the catastrophic event including at least one of earthquake, tsunami, hurricane, typhoon, flood, terrorism attack, and infectious disease, and the severity of the catastrophic event including at least one of intensity of the catastrophic event and population number affected by the catastrophic event.

4. A computer system for managing funding of catastrophe relief efforts associated with a special purpose entity, the system comprising:

a memory device configured to store computer readable instructions, and an electronic data structure that represents a financial product of the special purpose entity; and a processor of the special purpose entity that is configured to execute the computer readable instructions, in order to receive, by a payment receiving module, a purchase request from a charitable organization via a telecommunication network, wherein the purchase request comprises data defining a premium payment and specification of protection, offer the financial product to a donor by a control module, receive, by the payment receiving module, from the charitable organization payment of a premium assigned to the financial product, the premium corresponding to a monetary donation made to the charitable organization by the donor, receive, by the payment receiving module, via the telecommunication network, an investment request comprising a capital payment assigned to the financial product from one or more investors and a specification of the financial product, receive, by the payment receiving module, via the telecommunication network, from one or more investors payment of capital for the financial product, pay, by a payment module, an agreed upon amount corresponding to the premium paid by the charitable organization to the one or more investors, wherein the payment module is connected over the telecommunication network to a computer system or systems of the one or more investors, receive information about a catastrophic event including a parametric index indicative of a severity of the catastrophic event assigned to the financial product, and issue payment of the capital from the special purpose entity to the charitable organization, upon occurrence of the catastrophic event assigned to the financial product, for funding relief efforts for the catastrophic event, and repayment of the capital from the special purpose entity to the investors, otherwise.

5. The system of claim 4, wherein the parametric index is associated with at least one of defined geographical area, selected type of the catastrophic event, and severity of the catastrophic event.

6. The system of claim 4, wherein the parametric index is associated with a selected type of the catastrophic event and a severity of the catastrophic event, the type of catastrophic event including at least one of earthquake, tsunami, hurricane, typhoon, flood, terrorism attack, and infectious disease, and the severity of the catastrophic event including at least one of intensity of the catastrophic event and population number affected by the catastrophic event.

7. The method of claim 1, wherein the data structure includes a product identifier, a contract duration, a monetary amount of protection for a defined premium, and identification of the charitable organization.

8. The system of claim 4, wherein the data structure includes a product identifier, a contract duration, a monetary amount of protection for a defined premium, and identification of the charitable organization.

* * * * *